(12) United States Patent
Seron et al.

(10) Patent No.: US 11,155,898 B2
(45) Date of Patent: Oct. 26, 2021

(54) METHOD FOR EXTRACTING RARE EARTH ELEMENTS CONTAINED IN PERMANENT MAGNETS

(71) Applicant: BRGM, Orleans (FR)

(72) Inventors: Alain Seron, Saint Cyr en Val (FR); Nour-Eddine Menad, Orleans (FR); Dominique Breeze, Olivet (FR); Marc Gamet, Orleans (FR)

(73) Assignee: BRGM

( * ) Notice: Subject to any disclaimer, the term of this patent is extended or adjusted under 35 U.S.C. 154(b) by 177 days.

(21) Appl. No.: 16/306,612

(22) PCT Filed: Jun. 2, 2017

(86) PCT No.: PCT/FR2017/051399
§ 371 (c)(1),
(2) Date: Dec. 3, 2018

(87) PCT Pub. No.: WO2017/207947
PCT Pub. Date: Dec. 7, 2017

(65) Prior Publication Data
US 2019/0169710 A1    Jun. 6, 2019

(30) Foreign Application Priority Data
Jun. 3, 2016  (FR) ........................ 1655059

(51) Int. Cl.
*C22B 59/00* (2006.01)
*C22B 7/00* (2006.01)
(Continued)

(52) U.S. Cl.
CPC ............... *C22B 59/00* (2013.01); *C22B 1/02* (2013.01); *C22B 7/007* (2013.01); *C22B 3/165* (2013.01); *C22B 3/22* (2013.01); *Y02P 10/20* (2015.11)

(58) Field of Classification Search
CPC .......... C22B 59/00; C22B 7/007; C22B 3/165
See application file for complete search history.

(56) References Cited

U.S. PATENT DOCUMENTS 5,362,459 A    11/1994  Greenberg
5,429,724 A *  7/1995  Greenberg ............ C01F 17/265
                                                          205/560
(Continued)

FOREIGN PATENT DOCUMENTS

CN    101817547 A    9/2010
FR    2997095 A1     4/2014
(Continued)

OTHER PUBLICATIONS

Sigma-Aldrich, MSDS Formic Acid, Retrieved Nov. 10, 2020 (Year: 2020).*
(Continued)

*Primary Examiner* — Alexandra M Moore
*Assistant Examiner* — Austin Pollock
(74) *Attorney, Agent, or Firm* — St. Onge Steward Johnston & Reens LLC (57) ABSTRACT

The invention relates to a method for extracting rare earth elements contained in permanent magnets, which includes the steps of thermal treatment of the permanent magnet, crushing at the end of the thermal treatment in order to obtain particles with a size smaller than 2 mm, treatment by agitation of the particles in a solution containing an organic acid, and separation of the liquid phase from the solid phase.

14 Claims, 3 Drawing Sheets

(51) Int. Cl.
  *C22B 1/02* (2006.01)
  *C22B 3/22* (2006.01)
  *C22B 3/16* (2006.01)

(56) References Cited

U.S. PATENT DOCUMENTS

| | | | | |
|---|---|---|---|---|
| 5,429,887 | A | * | 7/1995 | Lyman ................... H01M 6/52 241/14 |
| 5,728,355 | A | * | 3/1998 | Asada .................. C01F 17/206 423/21.1 |
| 8,323,592 | B2 | | 12/2012 | Okabe et al. |
| 2015/0292060 | A1 | * | 10/2015 | Laucournet ............. C22B 7/007 423/21.1 |
| 2016/0319396 | A1 | * | 11/2016 | Jacobson .............. B09B 3/0016 |
| 2018/0202025 | A1 | * | 7/2018 | Jacobson ................ C22B 1/005 |

FOREIGN PATENT DOCUMENTS

| | | |
|---|---|---|
| JP | 2001335852 A | 12/2001 |
| JP | WO2007119846 A1 | 8/2009 |
| JP | 2010199110 A | 9/2010 |
| JP | WO2009119720 | 7/2011 |
| KR | 20060040162 A * | 5/2006 |
| WO | WO-03078671 A1 * | 9/2003 ............. C22B 59/00 |
| WO | 2007119846 A1 | 8/2009 |

OTHER PUBLICATIONS

Lee K., et al.; "Demagnetization follow by remagnetization of waste NdFeB magnet for reuse", J. Geosystem Engineering, vol. 16, Issue 4, 2013 (Year: 2013).*

Meric G, et al.; "Air Oxidation of Ferrous in Water", J. Int. Environmental Application and Science; vol. 3, p. 409-414, 2008 (Year: 2008).*

Yoon H.S., et al.; "The Effect of Grinding and Roasting Conditions on the Selective Leaching of Nd and Dy from NdFeB Magnet Scraps", J. metals, p. 1306-1314, 2015 (Year: 2015).*

Torn Vander Hoogerstraete, et al., "From NdFeB magnets towards the rare-earth oxides: a recycling process consuming only oxalic acid", RSC Adv, 2014, 4, pp. 64099-64111.

S.S. Behera, et al., "Leaching kinetics study of neodymium from the scrap magnet using acetic acid", Separation and Purification Technology 160 (2016) 59-66.

Yoon, Ho-Sung, et al., "Recovery of Neodymium from NdFeB Oxidation-Roasted Scrap by Acetic Acid Leaching", 2004, pp. 43-48 (2 page abstract only).

* cited by examiner

METHOD FOR EXTRACTING RARE EARTH ELEMENTS CONTAINED IN PERMANENT MAGNETS

FIELD OF THE INVENTION

The present invention relates to a process for extracting the rare-earth elements contained in permanent magnets originating in particular from waste electrical and electronic equipment (W3E or WEEE).

BACKGROUND OF THE INVENTION

WEEE forms the waste stream that is currently experiencing the greatest growth, between 2% and 3% each year. It has a high potential for recycling of the materials that make it up (ferrous and nonferrous metals, precious metals, glass, plastic, etc.). These economic and environmental challenges have justified the setting up of a specific management system for this waste, based on the principle of extended producer responsibility (EPR) for the producers of this equipment. Thus, the WEEE collection and recycling system has been operational in France since 22 Jul. 2005 for professional or non-household WEEE, and since 15 Nov. 2006 for household WEEE.

For all that, certain components are poorly recycled or are not recycled. This is the case for permanent magnets based on rare-earth elements present in many everyday objects, such as computers, televisions or cell phones. These permanent magnets mainly contain neodymium (Nd) alloyed with iron and boron. They may also comprise dysprosium (Dy) and praseodymium (Pr).

Numerous methods have already been proposed for recycling the rare-earth elements present in magnetic or nonmagnetic used products. However, these recycling methods are not completely satisfactory.

The following documents describe the recovery of the rare-earth elements contained in permanent magnets by direct chlorination or fluorination.

Document CN101817547 proposes to recover the rare-earth elements from a magnet via a process consisting in grinding the magnet, in adding carbon to the powder obtained then in placing this mixture in contact with a stream of chlorine gas in order to produce rare-earth element chlorides and a volatile iron chloride. The rare-earth elements are then purified by oxalic precipitation.

Document WO 2009/119720 uses a process by immersion of the alloy of rare-earth elements in a halogenated molten salt at high temperature that makes it possible to extract the rare-earth elements in the form of gaseous rare-earth element halides.

These two techniques are not very attractive considering the hazardous nature of the circulation of chlorinated or fluorinated gas.

A second recycling method uses a fusion process.

Document JP 2001-335852 is based on the mixing of a powder of magnets and a fluorinated agent such as $NH_4F$. The assembly is heated until the fusion thereof. The rare-earth elements are found, after cooling, as a mixture with a slag and can be separated by the difference in density.

Document JP 2010-199110 uses the same process of recycling by heating until fusion occurs and separation of the molten and nonmolten fractions. The latter fraction is rich in Nd alloy.

The major drawback of this type of fusion process is linked to the energy expenditure which leads to a high cost.

The third method of recycling is based on an extraction of rare-earth elements by a molten metal.

By way of example, the process of document WO 2007/119846 uses the oxidation of the magnets then the bringing into contact with molten aluminum resulting in the formation of a rare-earth element oxide as a mixture with a slag and an Fe—B alloy which must be separated subsequently. In this case, the difficulty lies in the delicate management of the aluminothermic reaction.

Another process, for its part, takes advantage of the strong affinity of molten magnesium for neodymium, unlike iron. The limits here are linked to the management of a metal in the gaseous state, and to the energy expenditure that is associated with the process.

Within the context of hydrometallurgical recycling, the process developed in document U.S. Pat. No. 5,362,459 consists in dissolving a slag originating from the preparation of an NdFeB alloy by electrolysis in a sulfamic acid bath, the bath then being mixed with hydrofluoric acid in order to precipitate neodymium fluoride.

This treatment method is not suitable for the bulky shapes of magnets and is very expensive from an energy point of view.

A process is already known from the document by Ho-Sung Yoon et al., J. of Korean Inst. of Resources Recycling (2004) vol. 13, no. 6, p. 43-48, for extracting the rare-earth elements contained in a permanent magnet. This process does not however comprise a separation step with respect to iron.

SUMMARY OF THE INVENTION

The objective of the invention is to propose an alternative process that has none or only some of these drawbacks and that enables the extraction of rare-earth elements contained in rare-earth element permanent magnets, more particularly of NdFeB type, which are optionally doped, i.e. to which other rare-earth elements such as Dy and/or Pr have been added.

This objective is achieved by provision of a process for extracting rare-earth elements contained in a permanent magnet, more particularly of NdFeB type, optionally to which rare-earth elements have been added, comprising the steps of:
  a) heat treating the permanent magnet at a temperature greater than or equal to its Curie temperature,
  b) grinding of the magnet resulting from the heat treatment step, the particles resulting from the grinding being classified in order to select the particles having, for 80% to 90% thereof, a size of less than 2 mm,
  c) treating, with stirring, the particles selected at the end of the grinding step with a solution containing an organic acid,
  d) separating a liquid phase from an optional solid phase at the end of the treatment with the solution containing the acid,
  e) separating the iron.

In some embodiments, the magnet particles resulting from the grinding having a size of less than 2 mm for 80% thereof.

In certain embodiments, the organic acid is acetic acid, oxalic acid or citric acid, or a mixture thereof.

In some embodiments, the solution containing an organic acid is at a concentration ranging from 5% to 30% by volume, and for example at a concentration of 10%.

In certain embodiments, the step of treating with a solution containing the organic acid is carried out for a minimum duration of 1 hour, preferentially less than 24 hours, more preferentially ranging from 100 to 420 minutes, for example around 420 minutes.

In some embodiments, the iron is separated by precipitation, for example due to the introduction of oxygen, for example by bubbling or mixing of an oxygen-containing gas, such as air, or pure oxygen.

In certain embodiments, the iron is separated by being brought into contact with at least one material of biological origin. In some of those embodiments, the material of biological origin is oyster shell powder. In other of those embodiments, the material of biological origin is pine bark powder.

The invention also provides a recycling process incorporating the inventive extraction processes where the permanent magnet originates from industrial waste.

DETAILED DESCRIPTION OF THE INVENTION

The magnets are characterized by the fact that they possess magnetic moments. Permanent magnets are magnets which have a remanence or persistence of their magnetic moments, that is to say that they retain their magnetic properties after the removal of a magnetizing field. A permanent magnet generally consists of a manufactured hard magnetic material, the remnant field and the coercive excitation of which are large. Permanent magnets nearly always contain atoms of at least one of the following chemical elements: iron, cobalt or nickel, or from the family of lanthanides (rare-earth elements). The synthetic magnets used in the present invention are produced by sintering an alloy containing powders of rare-earth elements which then forms a polarized alloy under an intense field of an electromagnet. Such materials are particularly used in the process according to the invention.

Magnets of NdFeB type are also known under the name of neodymium magnets. They are predominantly composed of an alloy of neodymium, iron and boron ($Nd_2Fe_{14}B$) making it possible to form a tetragonal crystalline system.

Permanent magnets of NdFeB type, when used in the process according to the invention, may be contained in industrial waste originating for example from the recycling of hard drives of central processing units of PC or laptop computer type, loudspeakers, for example of cell phones or computers, small electric motors or else be composed of waste from the production of permanent magnets. Such magnets are often surrounded by a layer of nickel. Nevertheless, the coating thereof may be based on other metals such as cobalt, a copper-cobalt alloy, zinc, etc. The same process can be applied to epoxy-coated magnets.

For this purpose, one subject of the invention is a process for extracting rare-earth elements contained in a permanent magnet, more particularly of NdFeB type, optionally to which rare-earth elements have been added, comprising the steps of:

a) heat treating the permanent magnet at a temperature greater than or equal to the Curie temperature thereof, b) grinding of the magnet resulting from the heat treatment step, the particles resulting from the grinding being classified in order to select the particles having, for 80% to 90% thereof, a size of less than 2 mm, c) treating, with stirring, the particles selected at the end of the grinding step with a solution containing an organic acid, d) separating the liquid phase from an optional solid phase at the end of the treatment with the solution containing the acid.

Advantageously, the liquid phase contains more than 70% by weight of the rare-earth elements from the permanent magnet that have undergone the preceding steps of the process.

The treatment above the Curie temperature, i.e. at a temperature generally greater than 300° C., preferentially between 300° C. and 400° C., and preferably around 350° C., enables the permanent demagnetization of the magnets, which is advantageous for the remainder of the process which is not disrupted by the magnetic properties of the magnets.

Preferentially, the heat treatment is carried out at a temperature below 600° C. Preferably, the sole objective of this heat treatment is the demagnetization. It does not have the objective of improving the dissolution of the metals in the solution containing the organic acid.

The heat treatment is preferentially carried out over a period of at least 10 minutes, and preferentially of between 10 and 40 minutes.

Grinding is understood to mean the fragmentation of the magnet by subjecting it to an impact or to a pressure.

The grinding step makes it possible to obtain magnet powder, the particle size of which is selected so as to favor the acid attack and the dissolution of the rare-earth elements. Specifically, the size of the particles influences the physicochemical properties of the substrate. The finer the product, the faster the dissolution, but the handling of excessively fine powders can in certain cases present disadvantages at various steps of the process.

Figure 1:
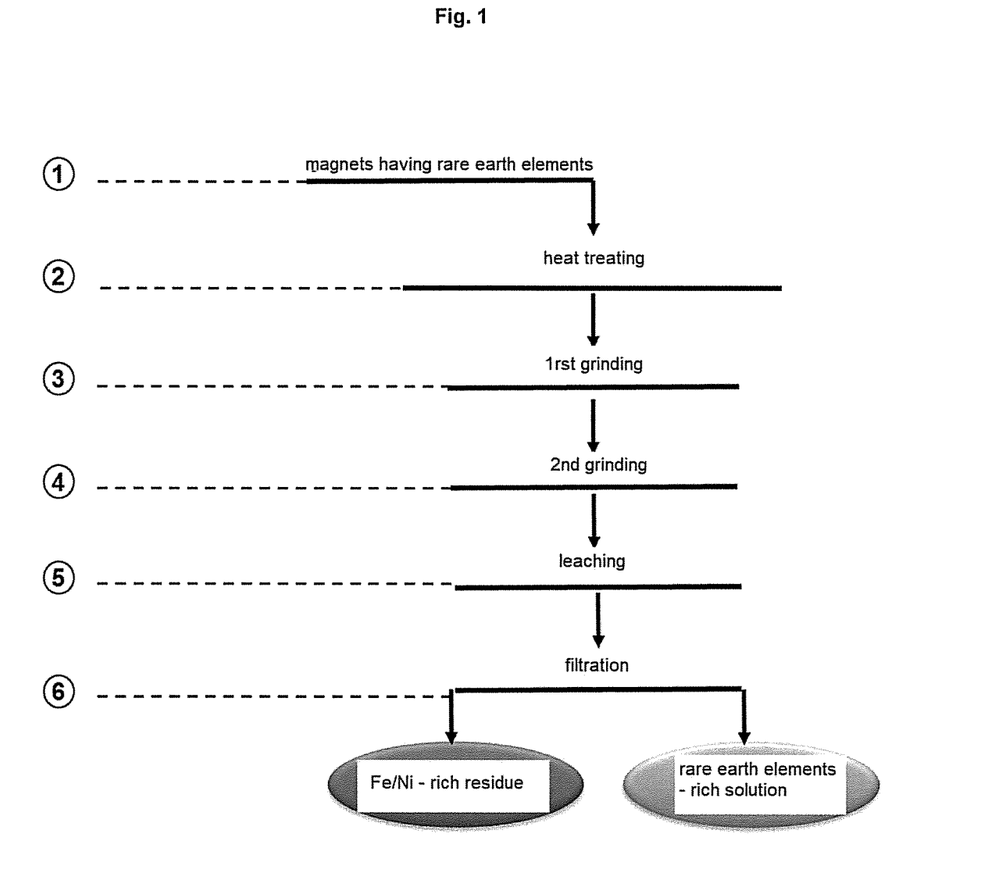
FIG. 1 depicts the process for extracting, according to one embodiment of the invention, rare-earth elements present in permanent magnets, which is similar to the embodiments exemplified in examples 2 to 4.

Preferentially, the grinding is a controlled grinding, for example broken down into at least two grinding steps where the discharges from the first grinding are subjected to a second grinding as described in FIG. 1:

a first step at the end of which magnet particles resulting from the grinding are classified in order to select particles having a size of less than 4 or 2 mm, a second step of grinding the particles not selected at the end of the first grinding step, the particles resulting from the second grinding being classified in order to select the particles having, for 80% to 90% thereof, a size of less than 2 mm.

Unlike thorough grinding, which is excessive because it produces more ultrafine particles than it should or because it gives a product that is generally finer than the desired product, controlled grinding is carried out so as to obtain precisely the desired particle size.

The controlled grinding in several steps avoids the production of fine particles that volatilize, which leads to a loss of material. Furthermore, it involves a lower energy expenditure than thorough grinding.

The controlled grinding may be carried out in a single step.

Preferentially, the particles are selected by screening.

Additional screening steps may be added to the process, the screening oversize (particles not selected at the end of the grinding) being ground again until the whole of the magnet has reached the particle size required for the next step of the process.

Preferably, the particles on which the acid attack is carried out have a size of less than 2 mm for 80% thereof, and preferentially for 90% thereof.

Preferably, the particles on which the acid attack is carried out have a size of greater than 0.2 mm for 80% thereof, and preferentially for 90% thereof.

More preferentially still, the particles on which the acid attack is carried out have a size of greater than 0.5 mm. These particle sizes are compatible with an industrial process since they require a limited energy expenditure during their production.

Advantageously, the grinding is carried out with the aid of a shredder, for example a cutting mill. The classification is carried out with the aid of a screen according to standard methods.

According to one alternative embodiment of the invention, the heat treatment step a) and grinding step b) may be replaced by the provision of demagnetized particles having, for 80% to 90% thereof, a size of less than 2 mm. Such particles may be derived from ground demagnetized magnets.

The treatment of the particles with the solution containing an organic acid, or acid attack, makes it possible to dissolve the constituents of the magnet and in particular the rare-earth elements in the solution. It may also lead to a more or less partial dissolution of a coating present on the surface of the magnet. In the case of nickel-based coatings, the dissolution is very limited which makes it possible to separate it, in the form of a solid nickel residue, at the end of the process.

This attack is carried out by a solution of organic acid, in particular C1-C10, preferably C1-C5, carboxylic acids having at least one or two carboxyl functions (or radicals). For example acetic acid, oxalic acid or citric acid, or a mixture thereof, are acids which are particularly advantageous to use in the process according to the invention.

The solvent of the acid is generally water.

Preferably, the acid solution has a concentration ranging from 5% to 30% by volume, and for example a concentration of around 10%. For acetic acid, this corresponds to a solution ranging from 0.8 to 2.4 M. Preferentially, the solution has an acetic acid concentration of greater than 1 M, and preferably of 1.6 M.

This may lead to complete or partial dissolving of the magnet powders and to an advantageous division between residual solid and solution of the various constituent elements of the permanent magnets.

Preferably, during the acid attack, the magnet powder corresponding to particles selected at the end of the heat treatment and grinding steps is added to the acid solution in a proportion of 150 g of powder per liter of acid solution.

The acid attack is preferably carried out for a minimum duration of 1 hour, preferentially less than 24 hours, more preferentially ranging from 100 to 550 minutes, for example around 420 minutes.

Preferably, the acid attack (or leaching) is carried out at a temperature ranging from 10 to 50° C., more preferentially from 10 to 30° C., and more preferentially still at ambient temperature, i.e. 20° C. It may be carried out in a static air or nitrogen atmosphere, in a stream of air or in a stream of nitrogen. Preferentially, the acid attack brings the pH of the solution to a pH of less than 2. The amount of acid to be added is therefore advantageously an amount of acid that makes it possible to achieve such a pH.

A low pH value increases the kinetics of the dissolution.

The liquid phase containing the rare-earth elements is then separated from the solid phase if not all of the compounds of the powder are dissolved. This is for example the case for magnets surrounded by a layer of nickel, particularly in the presence of an acetic acid solution. In this case the nickel, optionally combined with iron, remains in solid form and can therefore be recovered by simple solid/liquid separation.

This solid/liquid separation may be carried out by any known methods such as centrifugation (for example at 3500 rpm for 10 minutes), filtration or decantation.

At the end of the acid attack, at least one portion of the ferrous fraction of the magnets has passed into solution.

Preferably, the iron is separated from the rare-earth elements, optionally during an additional step. In this step, the iron may be precipitated whilst the rare-earth elements remain, at least partially, in the liquid phase.

In order to do this, oxygen may be introduced into the solution for example by bubbling or mixing with an oxygen-containing gas, such as air, or pure oxygen. Alternatively, it is also possible to envisage the use of hydrogen peroxide ($H_2O_2$). This mixture promotes the oxidation of the iron from the degree of oxidation 2 to the degree 3 and therefore the precipitation of iron III oxide or oxyhydroxide compounds at low pH (i.e. at a pH generally of less than 4). The pH is preferably measured using a pH meter with a pH measurement resolution of 0.01 unit, voltage measurement resolution of 1 mV and temperature measurement resolution of 0.1° C., such as the Heitolab P310 pH meter from Heito. Preferentially, for the measurement of the pH, the electrode is of Heito brand. The iron is thus precipitated and can be separated from the rare-earth elements by a phase separation step such as a filtration, a centrifugation or a decantation. Advantageously, the pH is kept below 4 by the addition of acid. Preferably, the solution is kept at a pH that enables the selective precipitation of the iron. For example, the pH is chosen between 3 and 4.

Alternatively or additionally, the inventors have shown that the separation of the iron is obtained by bringing the solution rich in rare-earth elements and in iron into contact with a material of biological origin such as oyster shell powder or pine bark powder. Many other biological materials are known for influencing the behavior of the metals in solution.

This is for example the case of dried algae. However, oyster shell powder and pine bark powder have displayed a particularly surprising efficacy for abatement of the iron with respect to the rare-earth elements. On the contrary, calcined bone powder tends to trap all of the metals including the iron and the rare-earth elements. These biological materials are advantageously used in the form of fine powder. Such a powder may essentially comprise particles having a size of from 0.5 to 5 mm, preferably from 0.6 to 2 mm, for example 1.25 mm.

The step of separating the iron may be carried out prior to the liquid/solid separation described in step d) of the process, or else after the liquid/solid separation and may be followed by a second liquid/solid separation step.

Preferentially, the rare-earth elements extracted by this process are chosen from Nd, Dy and Pr, and a mixture thereof.

Optionally, the extraction process is carried out on magnets that are coated, for example with nickel, cobalt, a copper-cobalt alloy, zinc, epoxy or a mixture of these compounds.

Another subject of the invention is a process for extracting rare-earth elements contained in demagnetized particles originating from a permanent magnet, more particularly of NdFeB type, optionally to which other rare-earth elements have been added, the process comprising the steps of:
  treating, with stirring, the particles with a solution containing an organic acid,
  separating the liquid phase from an optional solid phase at the end of the treatment with the solution containing the acid, the liquid phase advantageously containing more than 70% of the rare-earth elements of the permanent magnet that has undergone the preceding steps of the process.

The conditions and steps of demagnetization, and of obtaining the particles, for example by grinding, the size of the particles, the treatment with an acid solution and the separation steps leading to the extraction of the rare-earth elements may advantageously be as described above. Similarly, the steps of extracting the iron may also be applied to this process.

The invention also relates to a recycling process incorporating an extraction process according to the invention where the permanent magnet originates from industrial waste.

The invention also relates to the products obtained directly from the process according to the invention and the subsequent use thereof in particular in the electronics field.

Another subject of the invention is a process as described above that does not comprise any chemical reaction steps between the steps of providing demagnetized and ground magnet particles and the acid attack step.

Another subject of the invention is a process as described above that does not comprise any chemical reaction steps between the steps of acid attack and of solid/liquid separation and/or of precipitation and/or of fixation of the iron.

Another subject of the invention is a process as described in FIG. 1. This process may incorporate one or more of the features described above.

The invention will be better understood on reading the following examples, including figures, which are given solely by way of example.

Example 1 (Control): Analysis of a Permanent Magnet with No Coating

Figure 2A:
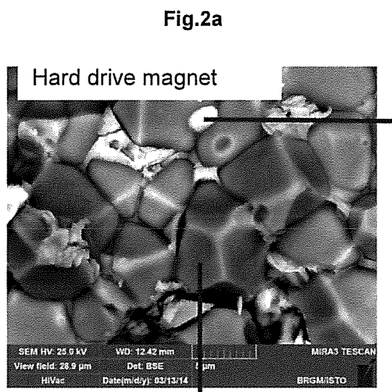
FIG. 2a is a photograph taken with a scanning electron microscope (SEM) of a permanent magnet according to control example 1.
Figure 2B:
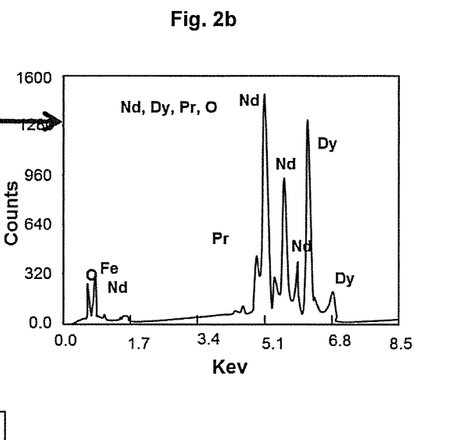
FIGS. 2b and 2c collate the results of qualitative chemical analysis by scanning electron microscopy-energy dispersive spectroscopy (SEM EDS) carried out on the magnet from example 1, during the visualisation thereof with SEM.
Figure 2C:
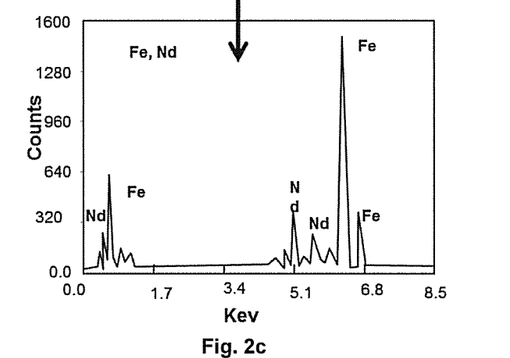

FIGS. 2a to 2c show the results of characterization by SEM imagery of a permanent magnet of NdFeB type, with no coating, which has not been subjected to the process according to the invention. The analysis makes it possible to demonstrate the granular structure of these magnets consisting of sintered crystals of $Nd_2Fe_{14}B$ phase (bottom arrow toward FIG. 2c) in the presence of an intergranular phase rich in rare-earth elements (top arrow toward FIG. 2b). In the SEM EDS analysis of a sintered crystal of $Nd_2Fe_{14}B$ phase (FIG. 2c), the characteristic line of Fe is identified, which is predominant, and the characteristic line of Nd which is well represented. In the intergranular phase rich in rare-earth elements (FIG. 2b), the emission lines of Nd, Pr and Dy are in particular identified.

Example 2: Extraction of the Rare-Earth Elements of Nickel-Coated Permanent Magnets Samples of permanent magnets resulting from laptop or desktop computers (step 1 of the process depicted in FIG. 1) of nickel-coated neodymium-iron-boron (NdFeB) type magnets were used. The chemical composition of the NdFeB alloy making up the core of the magnets is the following: iron 61.3%, neodymium 35%, dysprosium 1.8% and boron 1.4%.

These magnets were heat-treated for 20 minutes at a temperature of 350° C. in a muffled furnace, i.e. above their Curie temperature, with a view to permanently demagnetizing them (step 2 of the process described in FIG. 1), in order not to be disrupted in the remainder of the process by their magnetic properties.

At the end of this heat treatment, the samples were ground so as to obtain a particle size of less than 2 mm.

The screening oversize, i.e. the particles having a particle size greater than the desired particle size, were subjected to a second grinding step (step 4). This two-step grinding is a controlled grinding.

Steps 3 and 4 from FIG. 1 were carried out using a shredder-type grinder (RETSCH SM100 cutting mill—from Retsch GmbH, Retsch-Allee 1-5, 42781 Haan, Germany) with a 2 mm screen. The particles having a size greater than or equal to 2 mm were then subjected to a second grinding step using the same grinder with a 2 mm screen. In each of the steps 3 and 4, the powder was automatically classified on the 2 mm screen, resulting in a powder such that 100% of the particles had a size of less than 2 mm (quartile 10 or d100).

Subsequently, a sample of 15 g magnet powder resulting from this treatment was dispersed in 100 ml of a solution of acetic acid diluted to 10% in order to be subjected to a step of acid attack, or leaching (step 5). The mixture was left stirring for a period of 24 h, at a temperature of 30° C., in a static (ambient) air atmosphere. A kinetic study of the dissolution of the rare-earth elements, the iron and the nickel was carried out. Samples of the acid attack solution were drawn off during the reaction at the following times: 5 min, 15 min, 30 min, 1 h, 3 h, 4 h, 5 h, 6 h and 7 h. The samples were subjected to a centrifugation at 3500 rpm for 10 minutes. The supernatant was then filtered through a 0.22 μm syringe filter (step 6), so as to separate the solid phase from the liquid phase. The metallic solutions obtained were then subjected to an atomic absorption analysis in order to determine the concentration of the various dissolved metals.

Figure 3:
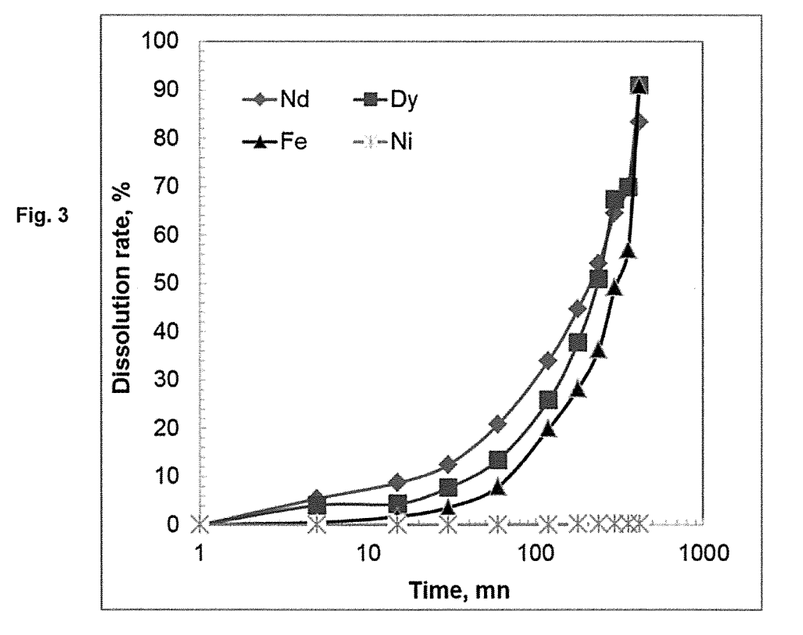
FIG. 3 presents the dissolution rates over time of Fe, Nd, Dy and Ni during the step of dissolution by acid attack of a process according to the invention that is the subject of example 2.

The results of the atomic absorption analyses of the concentration of Fe, Ni, Nd and Dy of the solutions resulting from the acid attacks of the various samples drawn off are illustrated in FIG. 3.

This kinetic study shows that the dissolution of the rare-earth elements in a diluted weak acid of acetic acid type is virtually complete after 420 minutes of treatment. In the case of nickel which forms the coating of the magnet, the dissolution remains very limited.

At the end of the step of acid solubilization by the acetic acid, the iron was precipitated. This precipitation was carried out by bringing the solution into contact with oxygen which is introduced into the solution by air bubbling. In order to promote the oxidation of the iron from the degree of oxidation 2 to the degree 3 and thus to bring about the precipitation of iron oxide or oxyhydroxide compounds, the pH was adjusted to a pH ranging from 3 to 4 by addition of a supplementary amount of acetic acid, in order to selectively precipitate iron III without precipitating the rare-earth elements. The pH was measured using a model P 310 Heito brand pH meter combined with a Heito electrode.

Examples 3 and 4

A magnet powder identical to that used in example 2 was treated according to the same methods as in example 2, except that the acid treatment step was carried out under nitrogen and the separation of the iron from the rare-earth elements is not carried out by placing in contact with oxygen. The metallic solutions rich in rare-earth elements obtained after dissolution by acid attack were treated with materials of biological origin that make it possible to optimize the separation of the rare-earth elements and of the iron.

Example 3

2.5 g of powder obtained by grinding, with the aid of a jaw crusher, fragments of maritime pine bark with a length or 20 to 40 mm sold by the company Castorama and of Verve brand (Kingfisher, 3 Sheldon Square, Paddington London W2 6PX), which was screened at 1.25 mm, were mixed with 50 ml of solution containing the iron and the rare-earth elements obtained after 420 minutes of reaction. The suspension of powder in the acid solution of rare-earth elements thus obtained was maintained under permanent stirring using an oscillating shaker, at 30° C. for 24 h.

Figure 4:
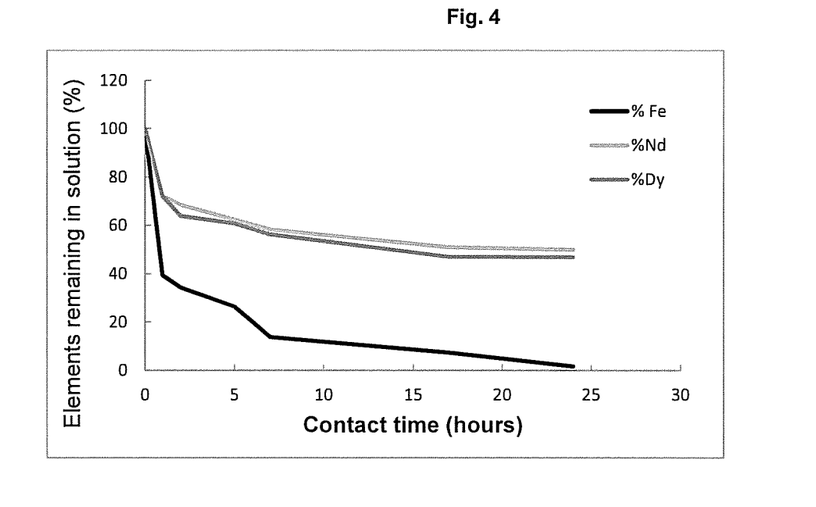
FIG. 4 presents the dissolution rates with respect to time of Fe, Nd and Dy during the iron precipitation step of a process according to the invention that is the subject of example 3.

The results of the atomic absorption analysis of the concentrations of Fe, Nd and Dy present in the successive samplings taken over time during this precipitation step are presented in FIG. 4. This figure shows that the iron (bottom curve), the Nd (top curve) and the Dy (intermediate curve) are fixed by the bark powder in proportions that are different from one another. The iron is removed from the solution in its entirety, whereas less than 50% of the rare-earth elements are removed. This process makes it possible to capture, and therefore to separate more particularly the $Fe^{II}$ from the solution. This process therefore makes it possible to extract the iron from the solution and to keep a large portion of the rare-earth elements in solution.

Example 4

2.5 g of a powder of oyster shells from from Marenne Oléron (protected geographical indication—PGI) resulting from food consumption and obtained by grinding with the aid of a jaw crusher, which was screened at 1.25 mm, were mixed with 50 ml of solution containing the iron and the rare-earth elements obtained. The suspension of powder in the acid solution of rare-earth elements thus obtained was maintained under permanent stirring using an oscillating shaker, at 30° C. for 24 h.

Figure 5:
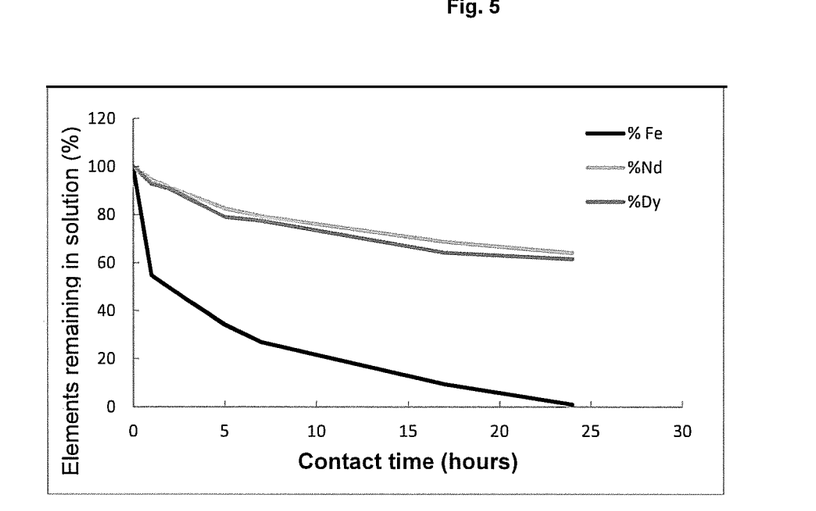
FIG. 5 presents the dissolution rates with respect to time of Fe, Nd and Dy during the iron precipitation step of a process according to the invention that is the subject of example 4.

The results of the atomic absorption analysis of the concentrations of Fe, Nd and Dy present in the successive samplings taken over time during this precipitation step are presented in FIG. 5. This figure shows that the iron (bottom curve), the Nd (top curve) and the Dy (intermediate curve) are fixed by the oyster shell powder in proportions that are different from one another. The iron is removed from the solution (precipitated) in its entirety, whereas less than 35% of the rare-earth elements are removed. This process makes it possible to capture, and therefore to separate more particularly the $Fe^{II}$ from the solution. This process therefore makes it possible to extract the iron from the solution and to keep a large portion of the rare-earth elements in solution.

The invention is not limited to the embodiments presented and other embodiments will be clearly apparent to a person skilled in the art.

The invention claimed is:

1. A process for extracting rare-earth elements contained in a permanent magnet of NdFeB type comprising the steps of:
   a) heat treating the permanent magnet at a temperature greater than or equal to its Curie temperature,
   b) grinding of the magnet resulting from the heat treatment step to obtain particles having, for 80% to 90% thereof, a size of less than 2 mm,
   c) treating, with stirring, the particles having, for 80% to 90% thereof, a size of less than 2 mm with a solution containing an organic acid,
   d) separating a liquid phase from an optional solid phase at the end of the treatment with the solution containing the organic acid, and
   e) separating the iron from rare-earth elements in said liquid phase by precipitating the iron,
   wherein the step of separating the iron from rare-earth elements further comprises the iron being brought into contact with at least one of oyster shell powder and pine bark powder.

2. A recycling process incorporating the extraction process according to claim 1, wherein the permanent magnet originates from industrial waste.

3. The process according to claim 1, wherein other rare earth elements have been added to the permanent magnet.

4. The process according to claim 1, wherein the step of separating the iron from rare-earth elements further comprises the iron being brought into contact with oyster shell powder.

5. The process according to claim 1, wherein the step of separating the iron from rare-earth elements further comprises the iron being brought into contact with pine bark powder.

6. The process according to claim 1, the organic acid being acetic acid, oxalic acid or citric acid, or a mixture thereof.

7. The process according to claim 1, wherein the magnet particles resulting from the grinding have a size of less than 2 mm for 80% thereof and the particles having a size of less than 2 mm for 80% thereof are treated in step c).

8. The process according to claim 1, the solution containing an organic acid has a concentration of organic acid ranging from 5% to 30% by volume.

9. The process according to claim 1, the treating with a solution containing the organic acid being carried out for a minimum duration of 1 hour.

10. The process according to claim 7, wherein the magnet particles resulting from the grinding have a size of less than 2 mm for 90% thereof and the particles having a size of less than 2 mm for 90% thereof are treated in step c).

11. The process according to claim 8, wherein the solution containing an organic acid has a concentration of organic acid of 10% by volume.

12. The process according to claim 9, wherein the treating with a solution containing an organic acid is carried out for less than 24 hours.

13. The process according to claim 12, wherein the treating with a solution containing an organic acid is carried out for 100 to 420 minutes.

14. The process according to claim 13, wherein the treating with a solution containing an organic acid is carried out for 420 minutes.

* * * * *